E. YOUNG.
FARM-GATE.

No. 177,609. Patented May 16, 1876.

Witnesses.
Samuel J. Mathies
John W. Derr

Inventor.
Ebenezer Young

UNITED STATES PATENT OFFICE.

EBENEZER YOUNG, OF CAMDEN CENTRE, MICHIGAN.

IMPROVEMENT IN FARM-GATES.

Specification forming part of Letters Patent No. 177,609, dated May 16, 1876; application filed February 24, 1876.

*To all whom it may concern:*

Be it known that I, EBENEZER YOUNG, of Camden Centre, in the county of Hillsdale and State of Michigan, have invented a new and Improved Gate; and I do hereby declare that the following is a full, clear, and exact description thereof, reference being had to the accompanying drawings.

Figure 1:
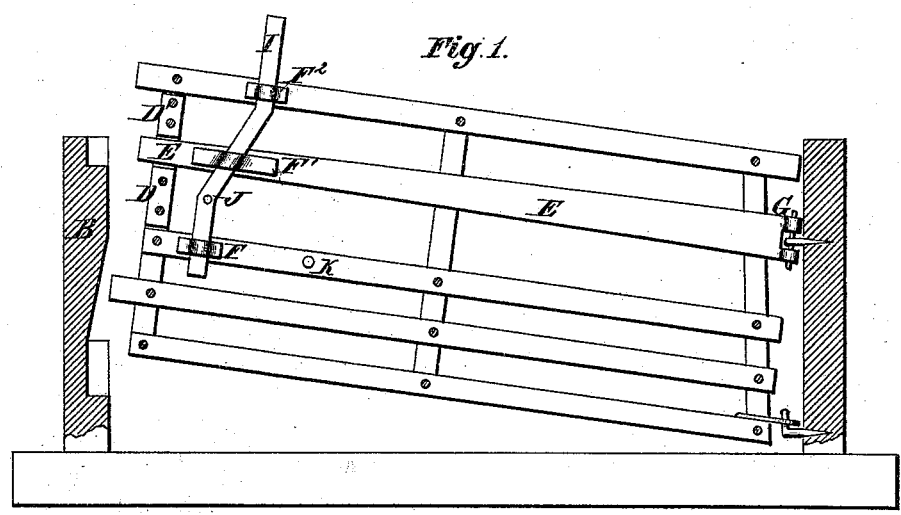
Figure 2:
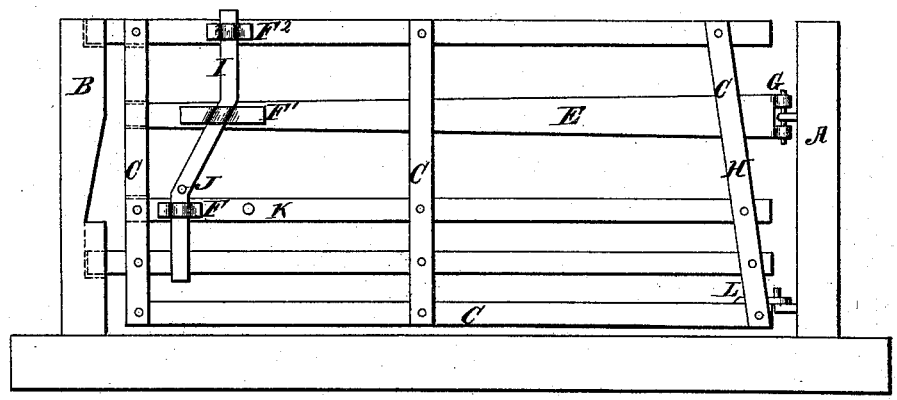

Figure 1 is a sectional view, with the lock-slide up and cross-bars broken out to show the friction-blocks D D'. Fig. 2 is the gate closed up.

The object of my invention is to furnish a new and improved gate, so constructed and arranged as to rest upon both posts when shut, and so that it may be raised to swing over snow or other obstructions, and so that it will lock when shut, to prevent swine or other animals from opening it; and it consists in the combination of the lock-slide I, clasps F $F^1$ $F^2$, friction-blocks D D', and hinge-bar E with the gate, as herein described. A is the rear post, to which the gate is hinged. B is the front post. C is the gate. G is the upper hinge, which is formed by a slot in the end of bar E, to receive the eye of the hinge, and it is plated with iron on both sides. A pivot passes through it and the eye of the hinge to form a joint, as shown in the drawing. L is the lower hinge, placed between the two lower horizontal and cross bars H, and fastened with a key. The front end of two of the horizontal bars projects forward, and acts as a latch to hold the gate shut. The cross-bars H incline forward, so as to be out of the way of the hinge G. The clasps F $F^1$ $F^2$ are bolted to the horizontal bars, as shown in the drawings, and the lock-slide is loose therein. The friction-blocks are fast between the cross-bars at D D'. By lifting the handle J the lock-slide runs up, moving the gate up and back on the bar E, which runs loosely through the gate, between the friction-blocks D D'. The lock-slide I is bent or constructed in the form as shown in the drawings, so that it has a wedge-power in lifting the gate, and is held up by friction. By lifting on the handle K the lock-slide is let loose and the gate is let down.

I use the bar E in my gate which was patented July 9, 1867, No. 66,063; and

What I claim as new, and as my invention, is—

The lock-slide I, clasps F $F^1$ $F^2$, friction-blocks D D', combined with the gate, all as and for the purpose set forth.

EBENEZER YOUNG.

Witnesses:
SAMUEL J. MATHIAS,
JOHN W. DERR.